(12) United States Patent
Suri et al.

(10) Patent No.: US 12,439,161 B2
(45) Date of Patent: Oct. 7, 2025

(54) METHOD AND ELECTRONIC DEVICE FOR GENERATING PANORAMIC IMAGE

(71) Applicant: Samsung Electronics Co., Ltd., Suwon-si (KR)

(72) Inventors: Sandeep Suri, Noida (IN); Abhishek Pathak, Noida (IN); Chirag Bansal, Noida (IN); Abhijeet Padhy, Noida (IN); Ram Pravesh Singh, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 344 days.

(21) Appl. No.: 17/891,657

(22) Filed: Aug. 19, 2022

(65) Prior Publication Data

US 2023/0156339 A1    May 18, 2023

Related U.S. Application Data

(63) Continuation of application No. PCT/KR2022/011862, filed on Aug. 9, 2022.

(30) Foreign Application Priority Data

Nov. 17, 2021  (IN) .............................. 202141052844

(51) Int. Cl.
*H04N 23/698*   (2023.01)
*G06N 3/04*   (2023.01)
(Continued)

(52) U.S. Cl.
CPC ........... *H04N 23/698* (2023.01); *G06N 5/047* (2013.01); *G06T 3/4038* (2013.01); *G06T 7/571* (2017.01); *G06V 10/74* (2022.01); *G06V 10/80* (2022.01); *H04N 23/632* (2023.01); *H04N 23/633* (2023.01); *H04N 23/64* (2023.01);
(Continued)

(58) Field of Classification Search
None
See application file for complete search history.

(56) References Cited

U.S. PATENT DOCUMENTS 7,317,473 B2    1/2008   Chen et al.
8,077,213 B2   12/2011   Culliksson
(Continued)

FOREIGN PATENT DOCUMENTS

EP              2627074 A1 *   8/2013   ............. H04N 1/212
JP           2016-122939 A      7/2016
(Continued)

OTHER PUBLICATIONS

STIC provided translation of Qi (WO2021/238317 A1) (Year: 2021).*

(Continued)

*Primary Examiner* — Tyler W. Sullivan
(74) *Attorney, Agent, or Firm* — Jefferson IP Law, LLP

(57) ABSTRACT

A method for generating a panoramic image using an electronic device is provided. The method includes obtaining a scene preview with an optimal wider view using a camera sensor(s) of the electronic device. The method includes analyzing the obtained scene preview to recommend an optimal traversal path. Further, the method includes capturing a plurality of frames using the optimal traversal path to generate the panoramic image. Further, the method includes storing the generated panoramic image.

17 Claims, 13 Drawing Sheets

(51) Int. Cl.
*G06N 5/047* (2023.01)
*G06T 3/4038* (2024.01)
*G06T 7/571* (2017.01)
*G06V 10/74* (2022.01)
*G06V 10/80* (2022.01)
*H04N 23/60* (2023.01)
*H04N 23/63* (2023.01)
*H04N 23/69* (2023.01)
*H04N 23/80* (2023.01)
*H04N 23/667* (2023.01)

(52) U.S. Cl.
CPC .............. *H04N 23/69* (2023.01); *H04N 23/80* (2023.01); *G06N 3/04* (2013.01); *H04N 23/667* (2023.01)

(56) References Cited

U.S. PATENT DOCUMENTS

| | | | |
|---|---|---|---|
| 8,120,641 B2 | 2/2012 | Kang et al. | |
| 8,768,098 B2 | 7/2014 | Zhang et al. | |
| 8,922,620 B2 | 12/2014 | Kim et al. | |
| 9,007,429 B2 | 4/2015 | Matsumoto et al. | |
| 9,723,203 B1 | 8/2017 | Ettinger | |
| 9,986,158 B2 | 5/2018 | Kim et al. | |
| 10,070,048 B2 | 9/2018 | Chang et al. | |
| 10,510,151 B2 | 12/2019 | Sheridan et al. | |
| 11,044,398 B2 | 6/2021 | Molina et al. | |
| 2007/0025723 A1 | 2/2007 | Baudisch et al. | |
| 2008/0043093 A1 | 2/2008 | Song | |
| 2011/0043604 A1 | 2/2011 | Peleg et al. | |
| 2014/0139621 A1 | 5/2014 | Shinozaki et al. | |
| 2014/0168358 A1 | 6/2014 | Gong et al. | |
| 2015/0029304 A1* | 1/2015 | Park | H04N 23/64 348/36 |
| 2015/0215532 A1 | 7/2015 | Jafarzadeh et al. | |
| 2018/0324399 A1* | 11/2018 | Spears | H04N 23/698 |
| 2021/0218883 A1 | 7/2021 | Ono et al. | |

FOREIGN PATENT DOCUMENTS

| | | |
|---|---|---|
| JP | 2020-154694 A | 9/2020 |
| WO | 2020/019299 A1 | 1/2020 |
| WO | WO-2021238317 A1 * | 12/2021 |
| WO | WO-2022048303 A1 * | 3/2022 ........... G06T 3/4038 |

OTHER PUBLICATIONS

STIC provided translation of Lin (WO2022/048303) (Year: 2022).*
STIC provided translation of Zhu, et al. (WO 2020/019299 A1) (Year: 2020).*
PE2E provided translation of Zhu, et al. (WO 2020/019299 A1) (Year: 2020).*
Indian Examination Report dated Dec. 18, 2023, issued in Indian Patent Application No. 202141052844.
International Search Report and Written Opinion dated Nov. 17, 2022, issued in International Application No. PCT/KR2022/011862.
XP 011685247, An Accurate Multi-Row Panorama Generation Using Multi-Point Joint Stitching, Apr. 27, 2018.
European Search Report dated Oct. 10, 2024, issued in European Application No. 22895797.3.

* cited by examiner

Horizontal scanning

Vertical scanning

Multi row-wise traversal

Multi column-wise traversal

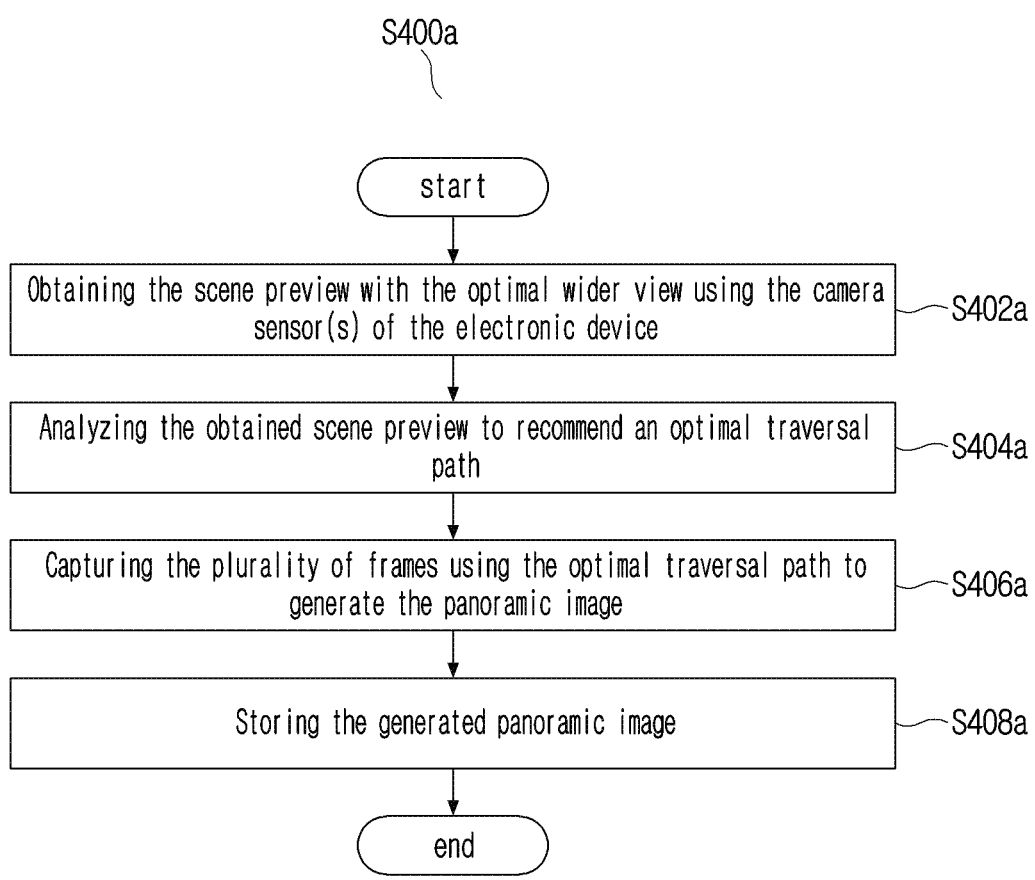

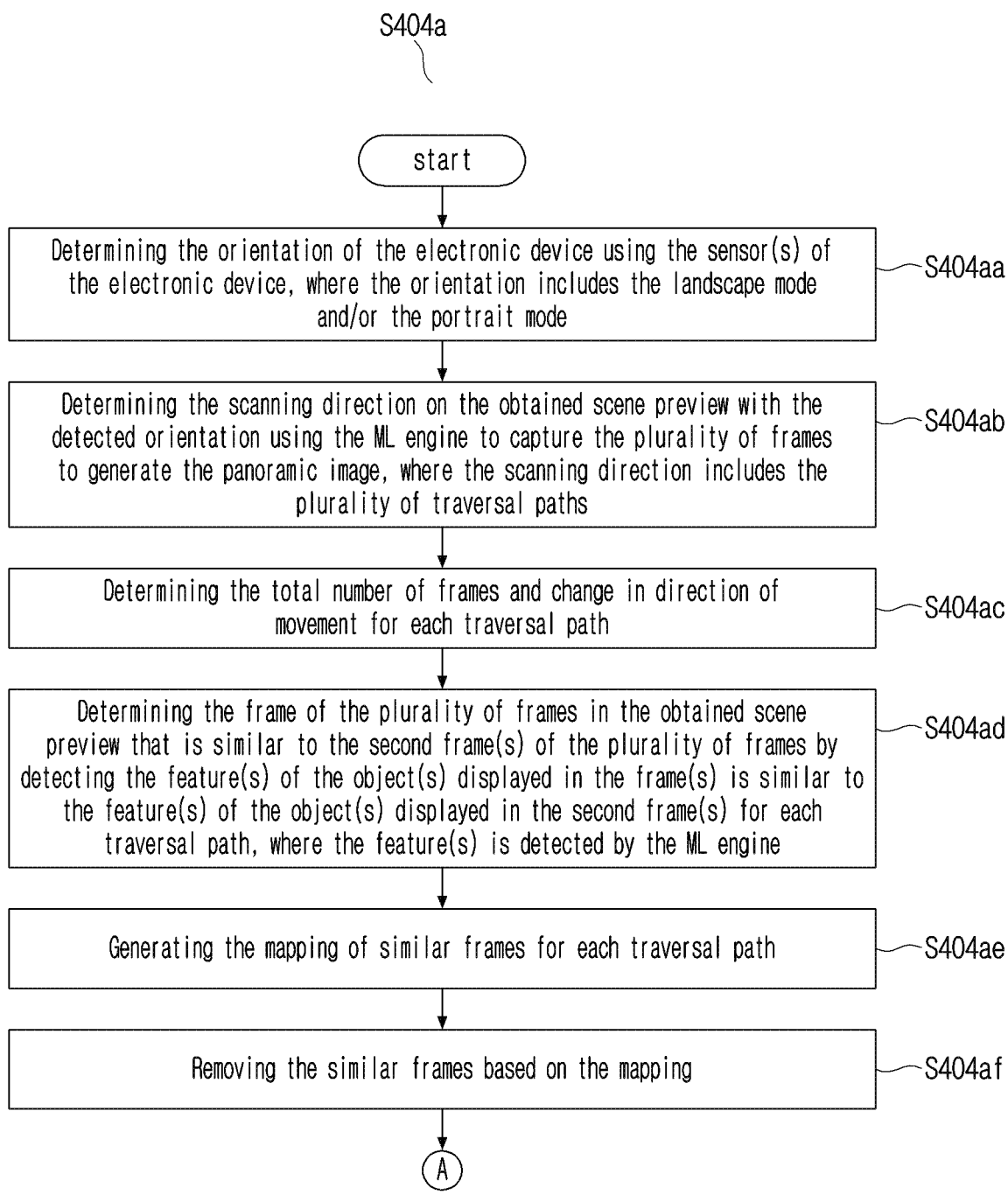

METHOD AND ELECTRONIC DEVICE FOR GENERATING PANORAMIC IMAGE

CROSS-REFERENCE TO RELATED APPLICATION(S)

This application is a continuation application, claiming priority under § 365(c), of an International Application No. PCT/KR2022/011862, filed on Aug. 9, 2022, which is based on and claims the benefit of an Indian Patent Application number 202141052844, filed on Nov. 17, 2021, in the Indian Intellectual Property Office, the disclosure of which is incorporated by reference herein in its entirety.

TECHNICAL FIELD

The disclosure relates to an electronic device. More particularly, the disclosure relates to a method and the electronic device for generating a panoramic image in the electronic device.

BACKGROUND ART

A panoramic image is a lengthy image that depicts a wide (or tall, if shot vertically) view. There are specialized cameras in an electronic device that are designed to capture the wide view, yet these specialized cameras are often incapable of capturing the wide view in one shot. As a result, a user of the electronic device must snap a series of images to cover the wide view. The electronic device then stitches the series of images together to generate a panoramic image using existing methods (e.g. Photoshop™, Lightroom™, or any post-processing tool that supports panorama generation). However, the resulting panoramic image has certain issues such as low resolution, blurriness, misalignment, and distortion, which affects user's experience.

FIG. 1 illustrates a problem in existing panoramic image generation methods, according to the related art.

Referring to FIG. 1, certain existing systems utilize a One-Dimensional (1D) panoramic method, in which the electronic device may only create 1D panoramas (single-row panoramas and/or single-column panoramas) that cover a straight line between start and end points. The 1D panorama may be either horizontal scanned (1) or vertically scanned (2). As a result, the user of the electronic device may only cover a restricted field of view/scene.

Certain existing systems utilize a Two-Dimensional (2D) panoramic method, as illustrated in FIG. 1, in which the electronic device may only create 2D panoramas (Multiple-row panorama (3) and/or multiple-column panorama (4)). The 2D panorama may be a combination of horizontal scanned and vertically scanned. For example, the user has to move the electronic device in any direction (e.g. left, right, top, and bottom) with respect to a first image to cover a complete field of view as there may be multiple ways of traversal resulting in a different number of frames needed to be captured and change in direction of movement. As the number of frames increase, more stitching is required between the captured frames which leads to distortion in the panoramic image. Furthermore, when the direction of movement changes, the chances of frame misalignment rise, resulting in blurriness in the panoramic image.

Thus, it is desired to provide a useful alternative for generating the panoramic image in the electronic device.

The above information is presented as background information only to assist with an understanding of the disclosure. No determination has been made, and no assertion is made, as to whether any of the above might be applicable as prior art with regard to the disclosure.

DISCLOSURE

Technical Problem

Aspects of the disclosure are to address at least the above-mentioned problems and/or disadvantages and to provide at least the advantages described below. Accordingly, an aspect of the disclosure is to provide an optimal traversal path (e.g. multi row-wise/portrait, multi row-wise/landscape, etc.) to a user of the electronic device for capturing a plurality of frames and generating a panoramic image using the plurality of frames based on a correlation of an orientation of an electronic device, an optimal scanning direction and a mapping of similar frames for each traversal path. The optimal traversal path includes a least number of frames and a least change in direction of movement among a plurality of traversal paths. The optimal scanning direction is determined using a Machine Learning (ML) model. As a result, the least number of frames is captured by the electronic device to generate the panoramic image which reduces memory consumption of the electronic device. Furthermore, the least change in direction to capture the plurality frames cause to reduce blurriness and misalignment of frames in the panoramic image. Furthermore, the electronic device stiches least number of frames which reduces distortion in the panoramic image and minimizes processing time and power consumption to generate the panoramic image.

Another aspect of the disclosure is to provide the optimal traversal path to the user of the electronic device by, but are not limited to, displaying a text recommendation on a screen of the electronic device, displaying an image recommendation on the screen of the electronic device, and playing an audio clip for recommendation in the electronic device. As a result, the user's experience improves while capturing the plurality number of frames to create the panoramic image.

Additional aspects will be set forth in part in the description which follows and, in part, will be apparent from the description, or may be learned by practice of the presented embodiments.

Technical Solution

In accordance with an aspect of the disclosure, a method for generating a panoramic image in an electronic device is provided. The method includes obtaining, by the electronic device, a scene preview with an optimal wider view using a camera sensor(s) of the electronic device. Further, the method includes analyzing, by the electronic device, the obtained scene preview to recommend an optimal traversal path. Further, the method includes capturing, by the electronic device, a plurality of frames using the optimal traversal path to generate the panoramic image. Further, the method includes storing, by the electronic device, the generated panoramic image.

In an embodiment, where the obtaining, by the electronic device, of the scene preview with the optimal wider view using the camera sensor(s) of the electronic device includes detecting, by the electronic device, that a user of the electronic device opens a camera application in a panorama mode. Further, the method includes obtaining, by the electronic device, a first scene preview by using a zoomed-out feature of the camera sensor(s). Further, the method includes obtaining, by the electronic device, a second scene preview by using an increased zoomed-out feature of the camera sensor(s). Further, the method includes determining, by the electronic device, whether feature information changes between the first scene preview and the second scene preview, where changes in the feature information are detected by a Machine Learning (ML) model. Further, the method includes selecting the first scene preview as the obtained scene preview with the optimal wider view in response to determining that the feature information does not change between the first scene preview and the second scene preview. Further, the method includes replacing the second scene preview with the first scene preview and obtaining the second scene preview by using the increased zoomed-out feature of the camera sensor(s) in response to determining that the feature information changes between the first scene preview and the second scene preview.

In another embodiment, where the analyzing, by the electronic device, of the obtained scene preview to recommend the optimal traversal path includes determining, by the electronic device, an orientation of the electronic device using a sensor(s) of the electronic device, where the orientation includes one of a landscape mode and a portrait mode. Further, the method includes determining, by the electronic device, a scanning direction on the obtained scene preview with the detected orientation using the ML model to capture the plurality of frames to generate the panoramic image, where the scanning direction includes a plurality of traversal paths. Further, the method includes determining, by the electronic device, a total number of frames and the change in direction of movement for each traversal path. Further, the method includes determining, by the electronic device, a frame(s) of the plurality of frames in the obtained scene preview that is similar to a second frame(s) of the plurality of frames by detecting a feature(s) of an object(s) displayed in the frame(s) is similar to a feature(s) of an object(s) displayed in the second frame(s) for each traversal path, where the feature(s) is detected by the ML model. Further, the method includes generating, by the electronic device, a mapping of similar frames for each traversal path. Further, the method includes removing, by the electronic device, similar frames based on the mapping. Further, the method includes re-determining, by the electronic device, the total number of frames and the change in direction of movement for each traversal path to recommend the optimal traversal path. Further, the method includes correlating, by the electronic device, the orientation, the scanning direction, and the similar frames. Further, the method includes recommending, by the electronic device, the optimal traversal path to capture the plurality of frames to generate the panoramic image based on the correlation, where the optimal traversal path includes a least number of frames and a least change in direction of movement among the plurality of traversal paths.

In yet another embodiment, the plurality of traversal paths includes a single row path, a single column path, a multi-row path, and a multi-column path.

In an embodiment, where the optimal traversal path is recommended to a user of the electronic device by, but are not limited to, displaying, by the electronic device, a text recommendation on a screen of the electronic device, displaying, by the electronic device, an image recommendation on the screen of the electronic device, and playing, by the electronic device, an audio clip for recommendation in the electronic device.

In another embodiment, the plurality of the frames is stitched together to generate the panoramic image using the ML model.

In yet another embodiment, where the panoramic image is generated by receiving, by the electronic device, a stitched image for each traversal path from a stitching engine, receiving, by the electronic device, a mapping of similar frames for each traversal path from a feature analyzer, and regenerating, by the electronic device, the panoramic image using the received mapping of similar frames for each traversal path, the received stitched image and the obtained scene preview from a memory of the electronic device.

In accordance with another aspect of the disclosure, an electronic device for generating the panoramic image is provided. The electronic device includes a panorama controller coupled with at least one processor and a memory. The panorama controller is configured to obtain the scene preview with the optimal wider view using the camera sensor(s) of the electronic device. Furthermore, the panorama controller is configured to analyze the obtained scene preview to recommend the optimal traversal path. Furthermore, the panorama controller is configured to capture the plurality of frames using the optimal traversal path to generate the panoramic image. Furthermore, the panorama controller is configured to store the generated panoramic image.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIG. 4A is a flow diagram illustrating a method for generating the panoramic image, according to an embodiment of the disclosure;

FIG. 4B is a flow diagram illustrating various operations for analyzing an obtained scene preview to recommend an optimal traversal path to generate the panoramic image, according to an embodiment of the disclosure;

Throughout the drawings, it should be noted that like reference numbers are used to depict the same or similar elements, features, and structures.

MODE FOR INVENTION

Figure 1:
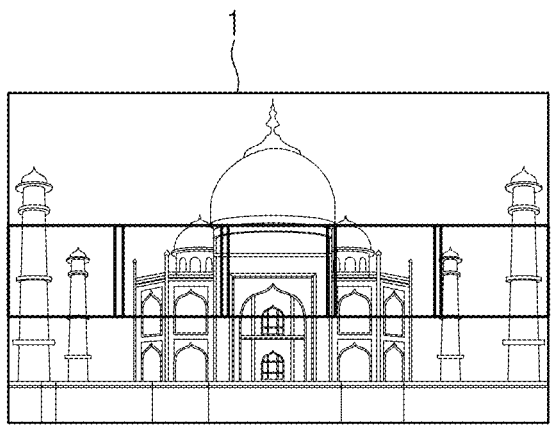
FIG. 1 illustrates a problem in existing panoramic image generation methods, according to the related art.
Figure 1:
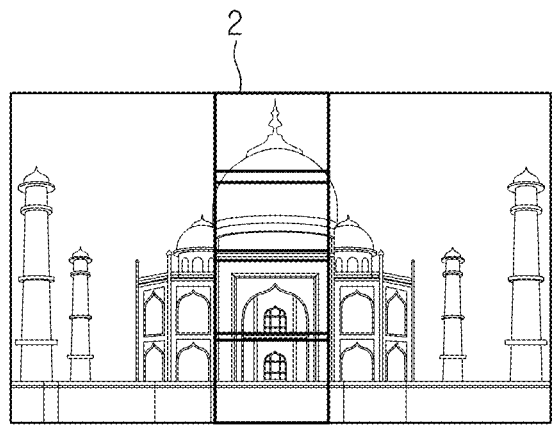
Figure 1:
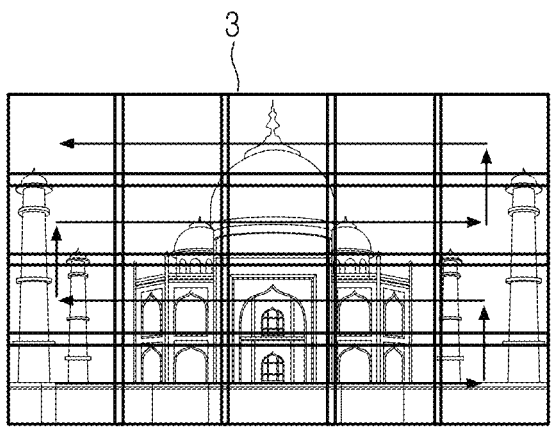
Figure 1:
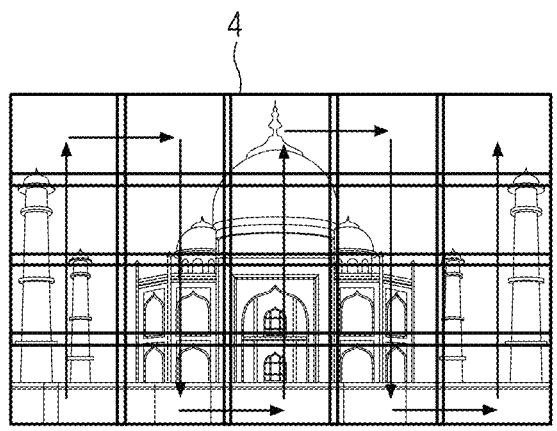

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Throughout this disclosure, the terms "camera sensor" and "camera" are used interchangeably and mean the same. The terms "Machine Learning (ML) model" and "ML engine" are used interchangeably and mean the same. The terms "display" and "screen" are used interchangeably and mean the same.

Accordingly, embodiments herein disclose a method for generating a panoramic image in an electronic device. The method includes obtaining, by the electronic device, a scene preview with an optimal wider view using a camera sensor(s) of the electronic device. The method includes analyzing, by the electronic device, the obtained scene preview to recommend an optimal traversal path. Further, the method includes capturing, by the electronic device, a plurality of frames using the optimal traversal path to generate the panoramic image. Further, the method includes storing, by the electronic device, the generated panoramic image.

Accordingly, embodiments herein disclose the electronic device for generating the panoramic image. The electronic device includes a panorama controller coupled with a processor and a memory. The panorama controller is configured to obtain the scene preview with the optimal wider view using the camera sensor(s) of the electronic device. Furthermore, the panorama controller is configured to analyze the obtained scene preview to recommend the optimal traversal path. Furthermore, the panorama controller is configured to capture the plurality of frames using the optimal traversal path to generate the panoramic image. Furthermore, the panorama controller is configured to store the generated panoramic image.

Unlike existing methods and systems, the proposed method allows the electronic device to recommend the optimal traversal path (e.g. multi row-wise/portrait, multi row-wise/landscape, etc.) to a user of the electronic device for capturing the plurality of frames and generating the panoramic image using the plurality of frames based on a correlation of an orientation of the electronic device, an optimal scanning direction and a mapping of similar frames for each traversal path. The optimal traversal path includes a least number of frames and a least change in direction of movement among a plurality of traversal paths. The optimal scanning direction is determined using a Machine Learning (ML) model. As a result, the least number of frames is captured by the electronic device to generate the panoramic image which reduces memory consumption of the electronic device. Furthermore, the least change in direction to capture the plurality frames cause to reduce blurriness and misalignment of frames in the panoramic image. Furthermore, the electronic device stiches least number of frames which reduces distortion in the panoramic image and minimizes processing time and power consumption to generate the panoramic image.

Unlike existing methods and systems, the proposed method allows the electronic device to recommend the optimal traversal path to the user of the electronic device by, but are not limited to, displaying a text recommendation on a screen of the electronic device, displaying an image recommendation on the screen of the electronic device, and playing an audio clip for recommendation in the electronic device. As a result, the user's experience improves while capturing the plurality number of frames to create the panoramic image.

Figure 2:
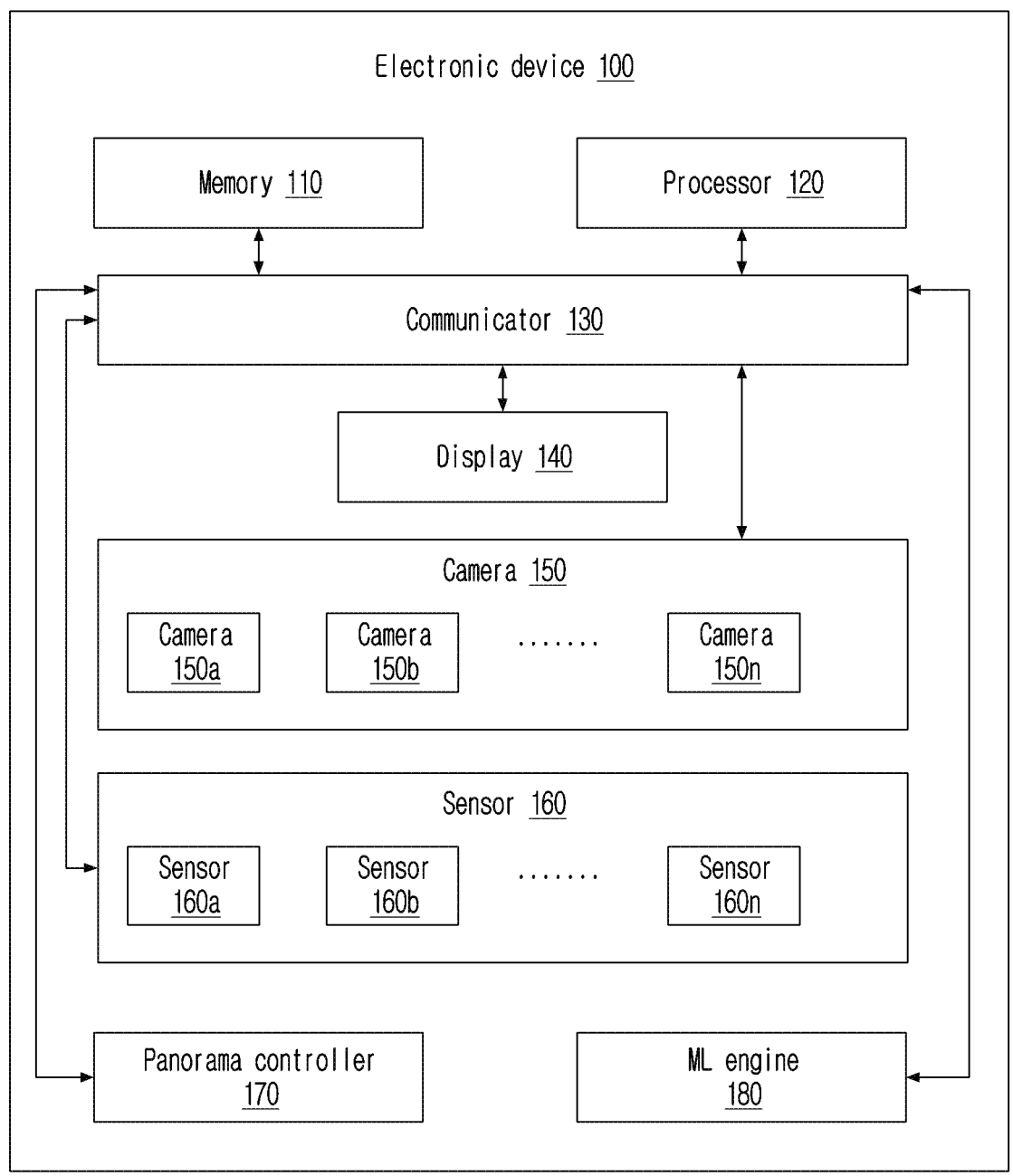
FIG. 2 is a block diagram of an electronic device for generating a panoramic image, according to an embodiment of the disclosure.

Referring now to the drawings, and more particularly to FIGS. 2, 3, 4A to 4C, 5, 6A to 6D, 7, and 8, where similar FIG. 2 is a block diagram of an electronic device (100) for generating a panoramic image, according to an embodiment of the disclosure.

Examples of the electronic device (100) include, but are not limited to a smartphone, a tablet computer, a Personal Digital Assistance (PDA), an Internet of Things (IoT) device, a wearable device, etc.

In an embodiment, the electronic device (100) includes a memory (110), a processor (120), a communicator (130), a display or screen (140), a camera (150) (e.g. Charge-coupled device (CCD), Electron-multiplying charge-coupled device (EMCCD), Complementary metal-oxide-semiconductor (CMOS), etc.), a sensor(s) (160) (e.g. accelerometer, ambient light sensor, ambient temperature sensor, air humidity sensor, barometer sensor, fingerprint sensor, gyroscope sensor, harmful radiation sensor, etc.), a panorama controller (170), and an ML engine (180).

In another embodiment, the memory (110) stores a scene preview (e.g. image display on a screen of the electronic device (100)) with an optimal wider view, an optimal traversal path, and a panoramic image. The memory (110) stores instructions to be executed by the processor (120). The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In some examples, the memory (110) may be configured to store larger amounts of information than the memory. In certain examples, a non-transitory storage medium may store data that can, over time, change (e.g., in Random Access Memory (RAM) or cache). The memory (110) may be an internal storage unit or it may be an external storage unit of the electronic device (100), a cloud storage, or any other type of external storage.

In another embodiment, the processor (120) communicates with the memory (110), the communicator (130), the display or screen (140), the camera (150), the sensor(s) (160), the panorama controller (170), and the ML engine (180). The processor (120) is configured to execute instructions stored in the memory (110) and to perform various processes. The processor (120) may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

In yet another embodiment, the communicator (130) is configured for communicating internally between internal hardware components and with external devices (e.g. server, etc.) via one or more networks (e.g. Radio technology). The communicator (130) includes an electronic circuit specific to a standard that enables wired or wireless communication.

The panorama controller (170) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the panorama controller (170) is configured to obtain the scene preview with the optimal wider view using the camera sensor (150, 150a, 150b . . . 150n) of the electronic device (100). Furthermore, the panorama controller (170) is configured to analyze the obtained scene preview to recommend the optimal traversal path. Furthermore, the panorama controller (170) is configured to capture a plurality of frames using the optimal traversal path to generate the panoramic image. Furthermore, the panorama controller (170) is configured to store the generated panoramic image in the memory (110).

In another embodiment, the panorama controller (170) is configured to detect that a user of the electronic device (100) opens a camera application in a panorama mode. Furthermore, the panorama controller (170) is configured to obtain a first scene preview by using a zoomed-out feature of the camera sensor (150). Furthermore, the panorama controller (170) is configured to obtain a second scene preview by using an increased zoomed-out feature of the camera sensor (150). Furthermore, the panorama controller (170) is configured to determine whether feature information changes between the first scene preview and the second scene preview, where changes in the feature information are detected by the ML model (180). The panorama controller (170) is configured to select the first scene preview as the obtained scene preview with the optimal wider view in response to determining that the feature information does not change between the first scene preview and the second scene preview. The panorama controller (170) is configured to replace the second scene preview with the first scene preview and obtain the second scene preview by using the increased zoomed-out feature of the camera sensor (150) in response to determining that the feature information changes between the first scene preview and the second scene preview.

In yet another embodiment, the panorama controller (170) is configured to determine an orientation of the electronic device (100) using a sensor(s) (160, 160a, 160b . . . 160n) of the electronic device (100), where the orientation includes a landscape mode and/or a portrait mode. Furthermore, the panorama controller (170) is configured to determine a scanning direction on the obtained scene preview with the detected orientation using the ML model (180) to capture the plurality of frames to generate the panoramic image, where the scanning direction includes a plurality of traversal paths. The plurality of traversal paths includes a single row path, a single column path, a multi-row path, and a multi-column path. The panorama controller (170) is configured to determine a total number of frames and change in direction of movement for each traversal path.

Furthermore, the panorama controller (170) is configured to determine a frame(s) of the plurality of frames in the obtained scene preview that is similar to a second frame(s) of the plurality of frames by detecting a feature(s) (e.g. shape, size, color, geometry, character, etc.) of an object(s) (e.g. building, car, bike, etc.) displayed in the frame(s) is similar to a feature(s) of an object(s) displayed in the second frame(s) for each traversal path, where the feature(s) is detected by the ML model (180). Furthermore, the panorama controller (170) is configured to generate a mapping of similar frames for each traversal path. Furthermore, the panorama controller (170) is configured to remove similar frames based on the mapping. Furthermore, the panorama controller (170) is configured to re-determine the total number of frames and the change in direction of movement for each traversal path to recommend the optimal traversal path. Furthermore, the panorama controller (170) is configured to co-relate the orientation, the scanning direction, and the similar frames. Furthermore, the panorama controller (170) is configured to recommend the optimal traversal path to capture the plurality of frames to generate the panoramic image based on the correlation, where the optimal traversal path includes a least number of frames and a least change in direction of movement among the plurality of traversal paths.

In an embodiment, the panorama controller (170) is configured to display a text recommendation on a screen (140) of the electronic device (100). In another embodiment, the panorama controller (170) is configured to display an image recommendation on the screen (140) of the electronic device (100). In another embodiment, the panorama controller (170) is configured to play an audio clip for recommendation in the electronic device (100).

In another embodiment, the panorama controller (170) is configured to stitch the plurality of the frames together to generate the panoramic image using the ML model (180). Furthermore, the panorama controller (170) is configured to receive a stitched image for each traversal path. Furthermore, the panorama controller (170) is configured to receive a mapping of similar frames for each traversal path. Furthermore, the panorama controller (170) is configured to regenerate the panoramic image using the received mapping of similar frames for each traversal path, the received stitched image, and the obtained scene preview from the memory (110) of the electronic device (100).

Although FIG. 2 shows various hardware components of the electronic device (100) but it is to be understood that other embodiments are not limited thereon. In other embodiments, the electronic device (100) may include less or more number of components. Further, the labels or names of the components are used only for illustrative purpose and does not limit the scope of the disclosure. One or more components may be combined to perform the same or substantially similar function to generate the panoramic image.

Figure 3:
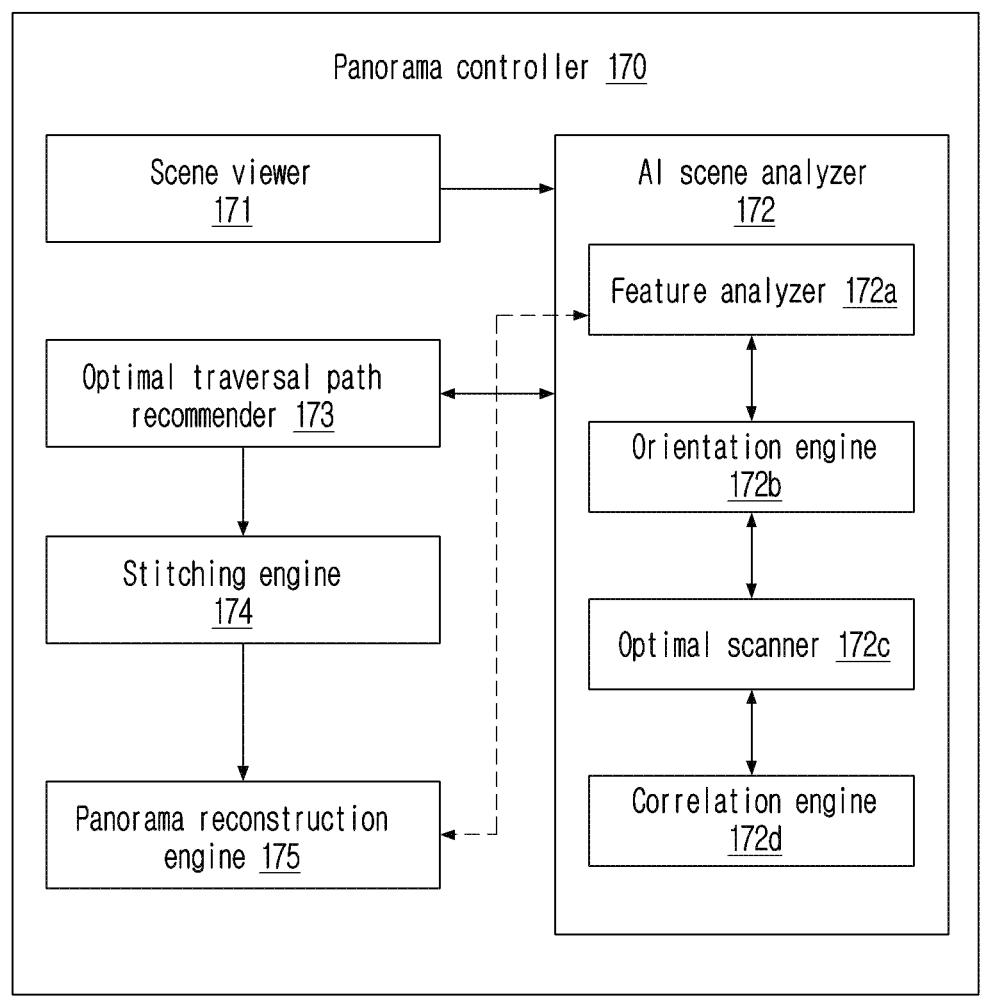
FIG. 3 is a block diagram of a panorama controller for generating the panoramic image, according to an embodiment of the disclosure.

FIG. 3 is a block diagram of the panorama controller (170) for generating the panoramic image, according to an embodiment of the disclosure.

In an embodiment, the panorama controller (170) includes a scene viewer (171), an Artificial Intelligence (AI) analyzer (172), an optimal traversal path recommender (173), a stitching engine (174), and a panorama reconstruction engine (175).

In another embodiment, the scene viewer (171) detects that the camera application is operating in the panorama mode in response to opening the camera application in the panorama mode by the user. Furthermore, the scene viewer (171) obtains the first scene preview by using the zoomed-out feature of the camera sensor (150). Furthermore, the scene viewer (171) obtains the second scene preview by using the increased zoomed-out feature of the camera sensor (150). Furthermore, the scene viewer (171) determines whether the feature information changes between the first scene preview and the second scene preview, where the changes in the feature information are detected by the ML model (180). Furthermore, the scene viewer (171) selects the first scene preview as the obtained scene preview with the optimal wider view in response to determining that the feature information does not change between the first scene preview and the second scene preview. Furthermore, the scene viewer (171) replaces the second scene preview with the first scene preview and obtain the second scene preview by using the increased zoomed out feature of the camera sensor (150) in response to determining that the feature information changes between the first scene preview and the second scene preview.

In yet another embodiment, the AI analyzer (172) includes a feature analyzer (172a), an orientation engine (172b), an optimal scanner (172c), and a correlation engine (172d). The orientation engine (172b) determines the orientation of the electronic device (100) using the sensor(s) (160) of the electronic device (100), where the orientation includes the landscape mode and/or the portrait mode. The optimal scanner (172c) determines the scanning direction on the obtained scene preview with the detected orientation using the ML model (180) to capture the plurality of frames to generate the panoramic image, where the scanning direction includes the plurality of traversal paths. The plurality of traversal paths includes the single row path, the single-column path, the multi-row path, and the multi-column path. Furthermore, the optimal scanner (172c) determines the total number of frames and the change needed in direction of movement for each traversal path.

In an embodiment, the feature analyzer (172a) determines the frame(s) of the plurality of frames in the obtained scene preview that is similar to the second frame(s) of the plurality of frames by detecting the feature(s) of the object(s) displayed in the frame(s) is similar to the feature(s) of the object(s) displayed in the second frame(s) for each traversal path, where the feature(s) is detected by the ML model (180).

In another embodiment, the correlation engine (172d) generates the mapping of the similar frames for each traversal path. Furthermore, the correlation engine (172d) removes the similar frames based on the mapping. Furthermore, the correlation engine (172d) re-determines the total number of frames and the change in direction of movement for each traversal path to recommend the optimal traversal path. Furthermore, the correlation engine (172d) co-relates the orientation, the scanning direction, and the similar frames.

In yet another embodiment, the optimal traversal path recommender (173) recommends the optimal traversal path to capture the plurality of frames to generate the panoramic image based on the correlation, where the optimal traversal path includes the least number of frames and the least change in direction of movement among the plurality of traversal paths. Furthermore, the optimal traversal path recommender (173) displays the text recommendation on the screen (140) of the electronic device (100) and/or display the image recommendation on the screen (140) of the electronic device (100) and/or play the audio clip for recommendation in the electronic device (100).

In an embodiment, the stitching engine (174) stitches the plurality of the frames together to generate the panoramic image using the ML model (180) (e.g. Scale-Invariant Feature Transform (SIFT), holography projection, Random Sample Consensus (RANSAC), etc.)

In another embodiment, the panorama reconstruction engine (175) receives the stitched image for each traversal path from the stitching engine (174). Furthermore, the panorama reconstruction engine (175) receives the mapping of similar frames for each traversal path from the feature analyzer (172a). Furthermore, the panorama reconstruction engine (175) regenerates the panoramic image using the received mapping of similar frames for each traversal path, the received stitched image, and the obtained scene preview from the memory (110) of the electronic device (100).

Although FIG. 3 shows various hardware components of the panorama controller (170) but it is to be understood that other embodiments are not limited thereon. In other embodiments, the panorama controller (170) may include less or more number of components. Further, the labels or names of the components are used only for illustrative purpose and does not limit the scope of the disclosure. One or more components may be combined to perform the same or substantially similar function to generate the panoramic image.

At least one of the plurality of modules/components of FIGS. 2 and 3 may be implemented through the ML engine (180). A function associated with the ML engine (180) may be performed through corresponding memory (110) and the processor (120). The one or a plurality of processors controls the processing of the input data in accordance with a predefined operating rule or AI model stored in the non-volatile memory and the volatile memory. The predefined operating rule or artificial intelligence model is provided through training or learning. Here, being provided through learning means that, by applying a learning process to a plurality of learning data, a predefined operating rule or AI model of a desired characteristic is made. The learning may be performed in a device itself in which AI according to an embodiment is performed, and/o may be implemented through a separate server/system.

In an embodiment, the ML engine (180) may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

In another embodiment, the learning process is a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

FIG. 4A is a flow diagram (S400a) illustrating a method for generating the panoramic image, according to an embodiment of the disclosure.

The method allows the electronic device (100) to perform operations S402a-S408a.

At operation S402a, the method includes obtaining the scene preview with the optimal wider view using the camera sensor (150) of the electronic device (100). At operation S404a, the method includes analyzing the obtained scene preview to recommend the optimal traversal path. At operation S406a, the method includes capturing the plurality of frames using the optimal traversal path to generate the panoramic image. At operation S408a, the method includes storing the generated panoramic image.

FIG. 4B is a flow diagram (S404a) illustrating various operations for analyzing the obtained scene preview to recommend the optimal traversal path to generate the panoramic image, according to an embodiment of the disclosure.

Figure 4C:
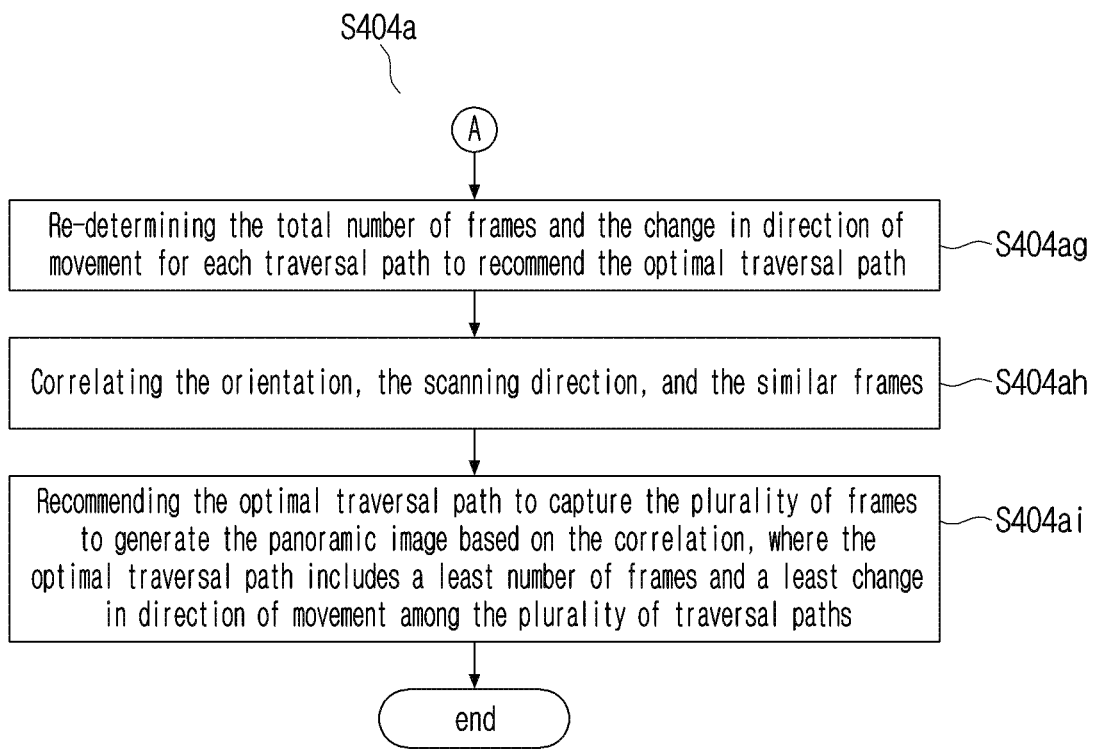
FIG. 4C is a flow diagram illustrating various operations according to an embodiment of the disclosure.

FIG. 4C is a flow diagram illustrating various operations according to an embodiment of the disclosure.

The method allows the electronic device (100) to perform operations S404aa-S404ai.

At operation S404aa, the method includes determining the orientation of the electronic device (100) using the sensor(s) (150) of the electronic device (100), where the orientation includes the landscape mode and/or the portrait mode. At operation S404ab, the method includes determining the scanning direction on the obtained scene preview with the detected orientation using the ML engine (180) to capture the plurality of frames to generate the panoramic image, where the scanning direction includes the plurality of traversal paths. At operation S404ac, the method includes determining the total number of frames and the change in direction of movement for each traversal path. At operation S404ad, the method includes determining the frame of the plurality of frames in the obtained scene preview that is similar to the second frame(s) of the plurality of frames by detecting the feature(s) of the object(s) displayed in the frame(s) is similar to the feature(s) of the object(s) displayed in the second frame(s) for each traversal path, where the feature(s) is detected by the ML engine (180).

At operation S404ae, the method includes generating the mapping of similar frames for each traversal path. At operation S404af, the method includes removing similar frames based on the mapping. At operation S404ag, the method includes re-determining the total number of frames and the change in direction of movement for each traversal path to recommend the optimal traversal path. At operation S404ah, the method includes correlating the orientation, the scanning direction, and similar frames. At operation S404ai, the method includes recommending the optimal traversal path to capture the plurality of frames to generate the panoramic image based on the correlation, where the optimal traversal path includes the least number of frames and the least change in direction of movement among the plurality of traversal paths.

The various actions, acts, blocks, steps, or the like in the flow diagrams (S400a, S404a) may be performed in the order presented, in a different order, or simultaneously. Further, in some embodiments, some of the actions, acts, blocks, steps, or the like may be omitted, added, modified, skipped, or the like without departing from the scope of the invention.

Figure 5:
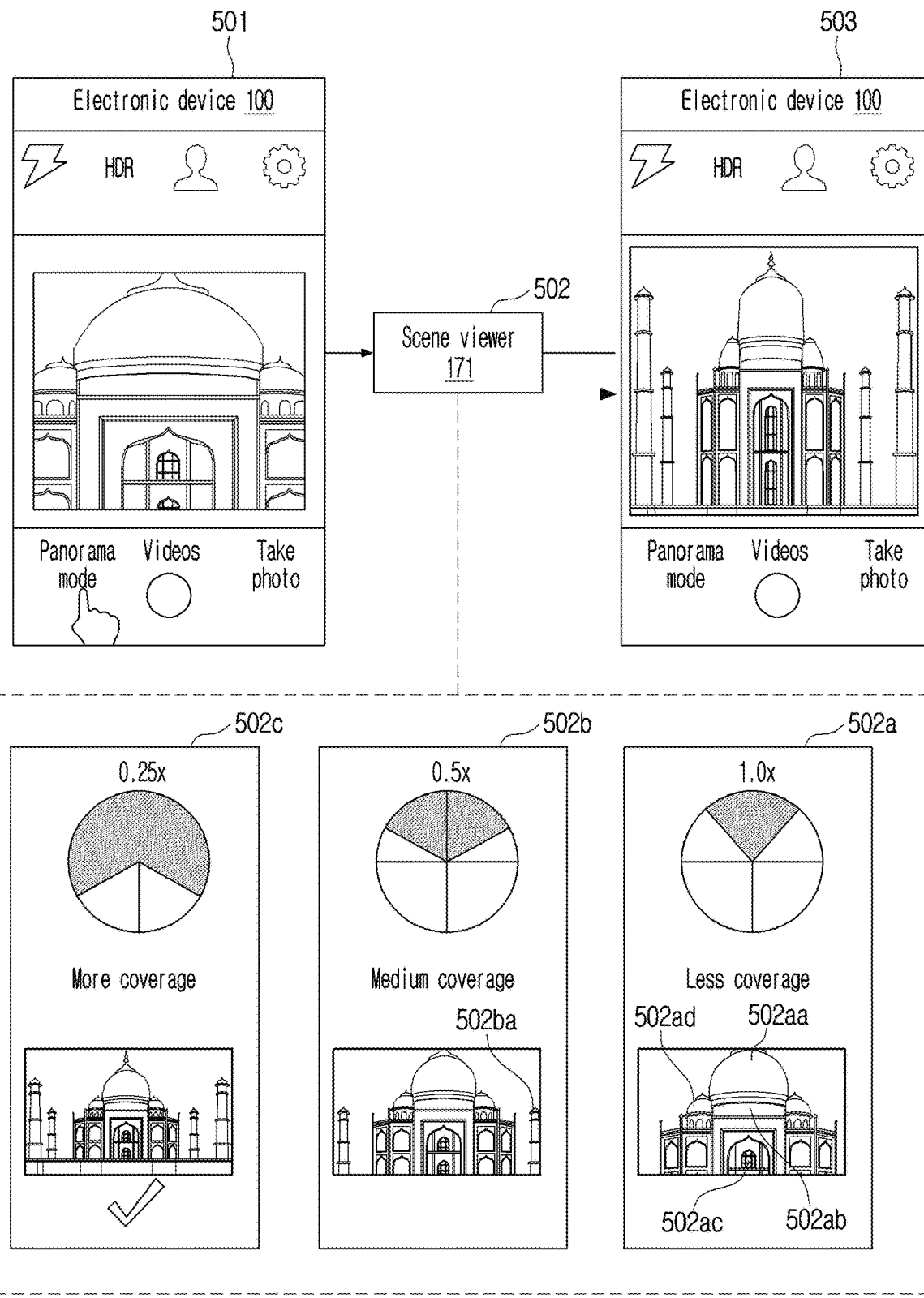
FIG. 5 is an example scenario illustrating various operations for obtaining a scene preview with an optimal wider view using a camera sensor(s) of the electronic device, according to an embodiment of the disclosure.
Figure 6A:
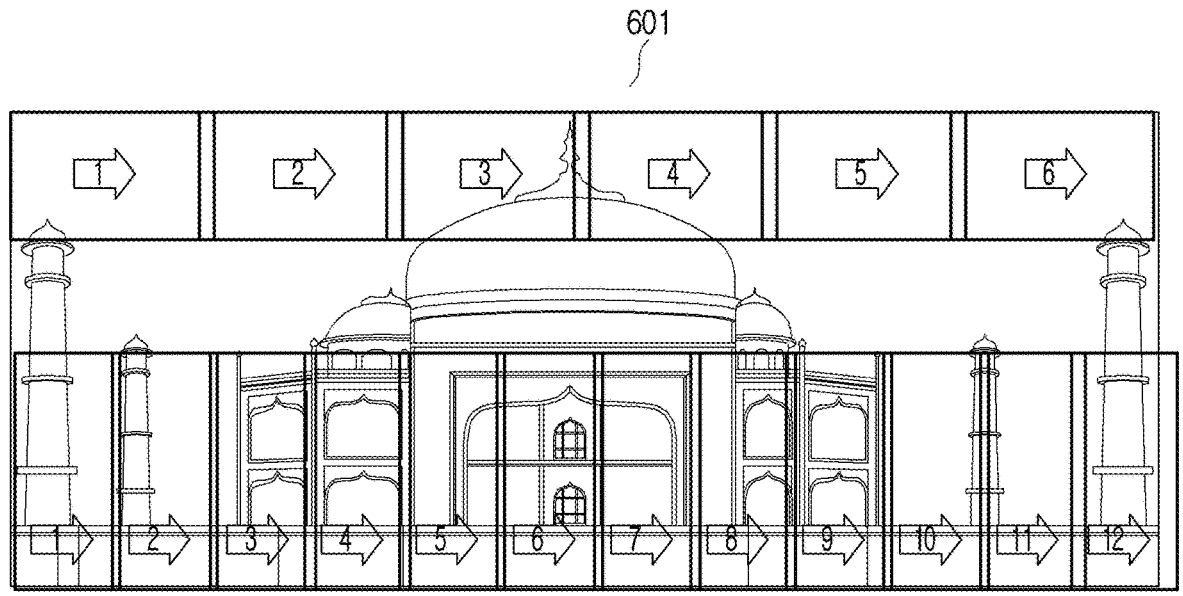
FIGS. 6A, 6B, 6C, and 6D are an example scenario illustrating various operations for analyzing the obtained scene preview to recommend the optimal traversal path to generate the panoramic image, according to various embodiments of the disclosure.
Figure 6A:
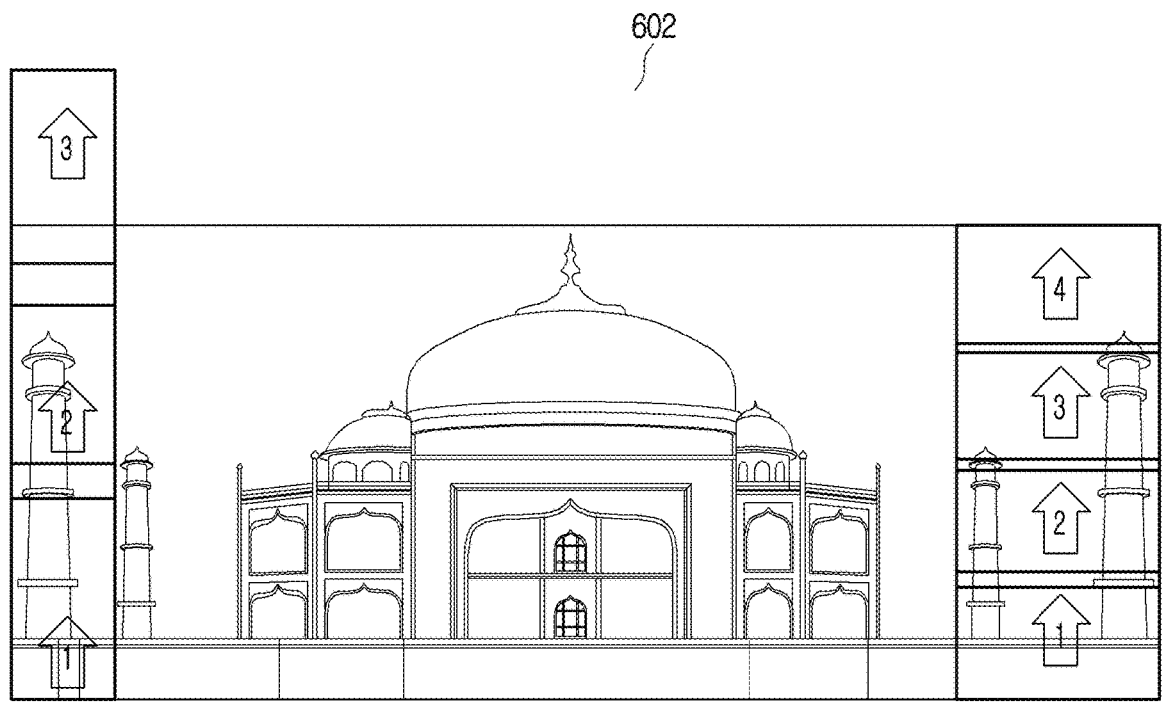
Figure 6B:
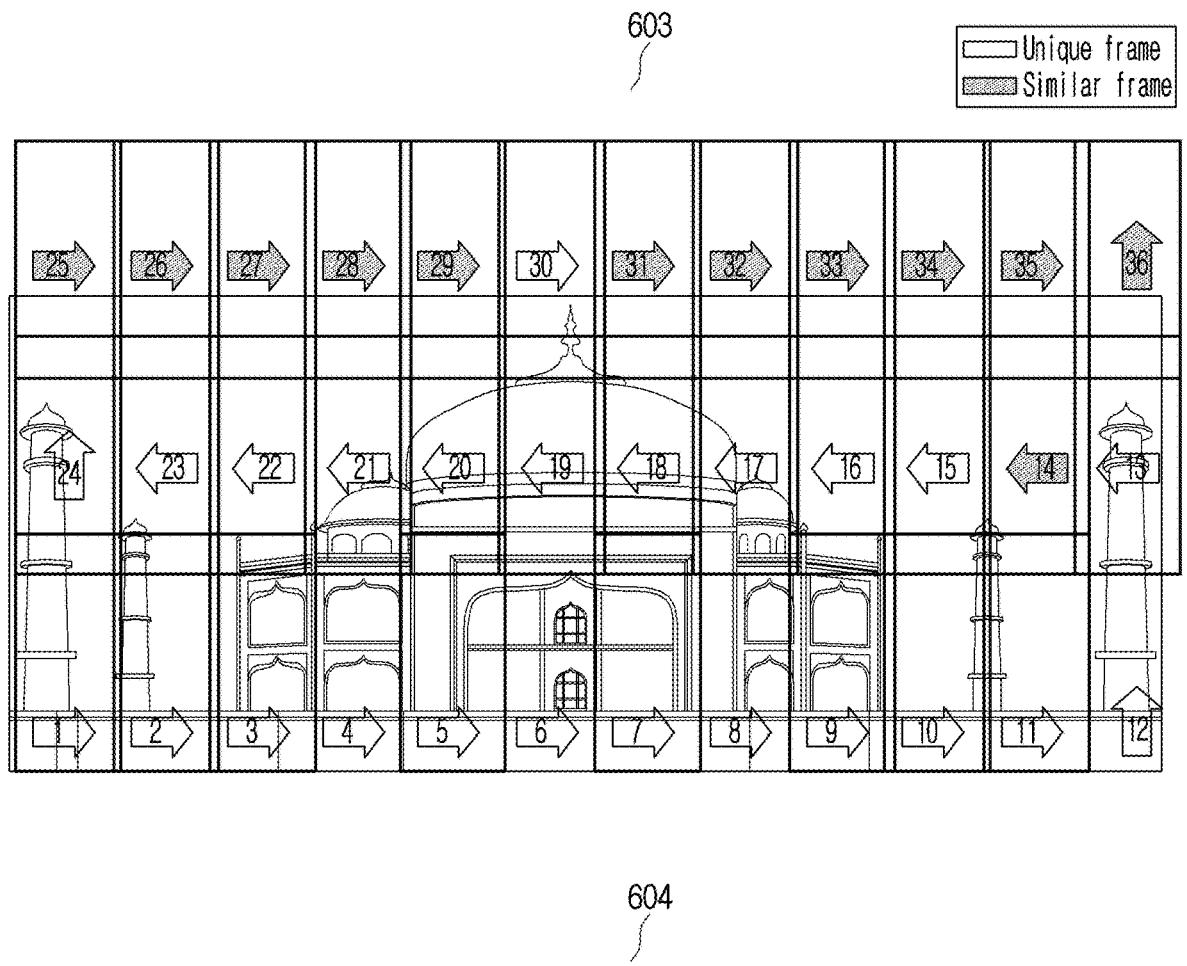
Figure 6B:
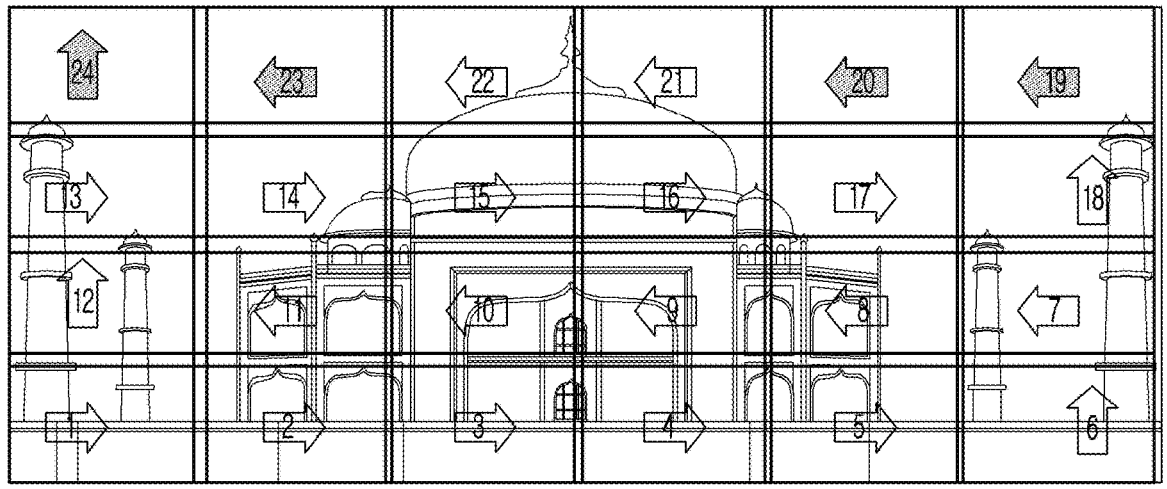
Figure 6C:
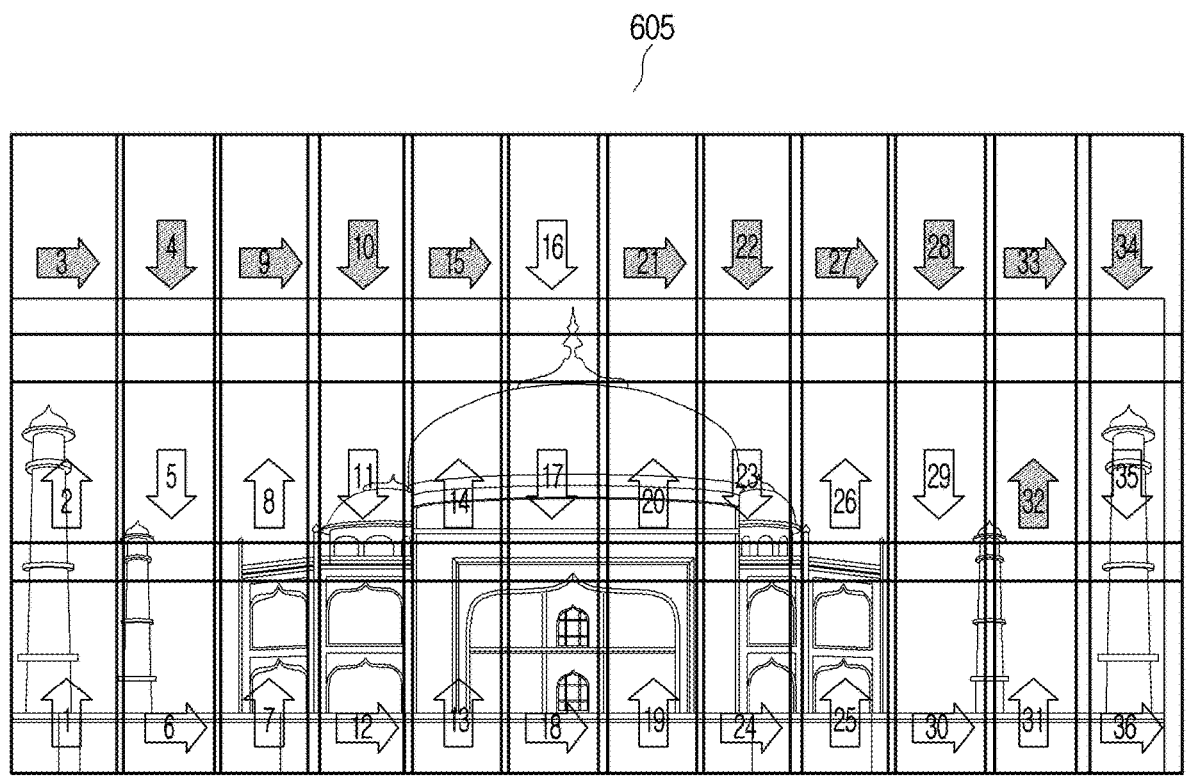
Figure 6C:
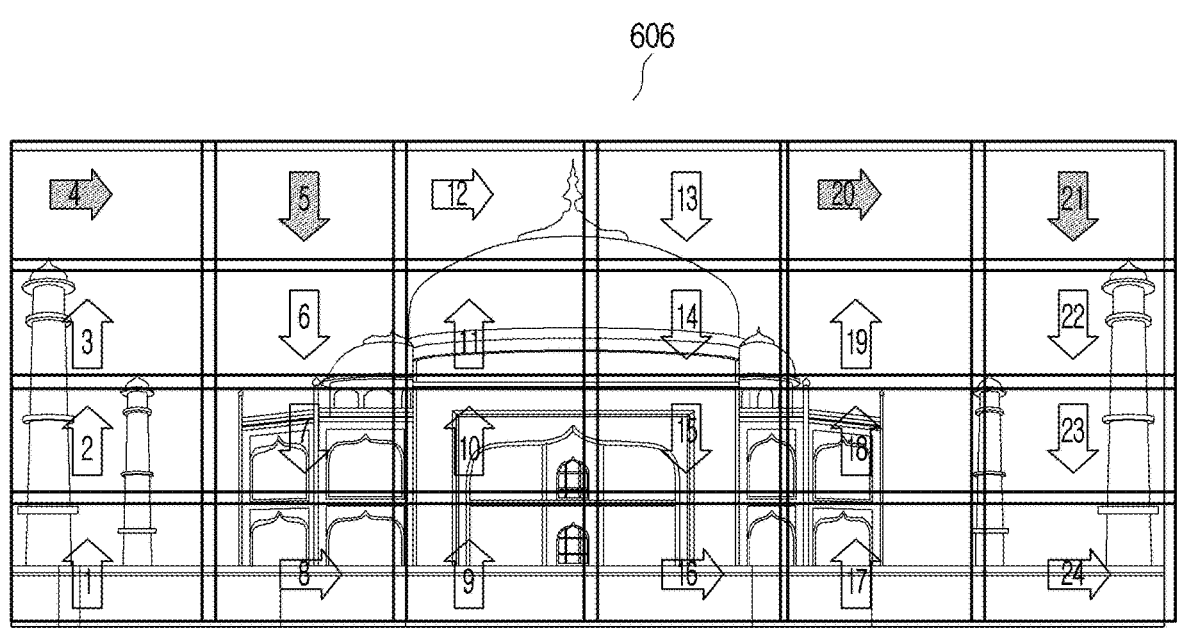
Figure 6D:
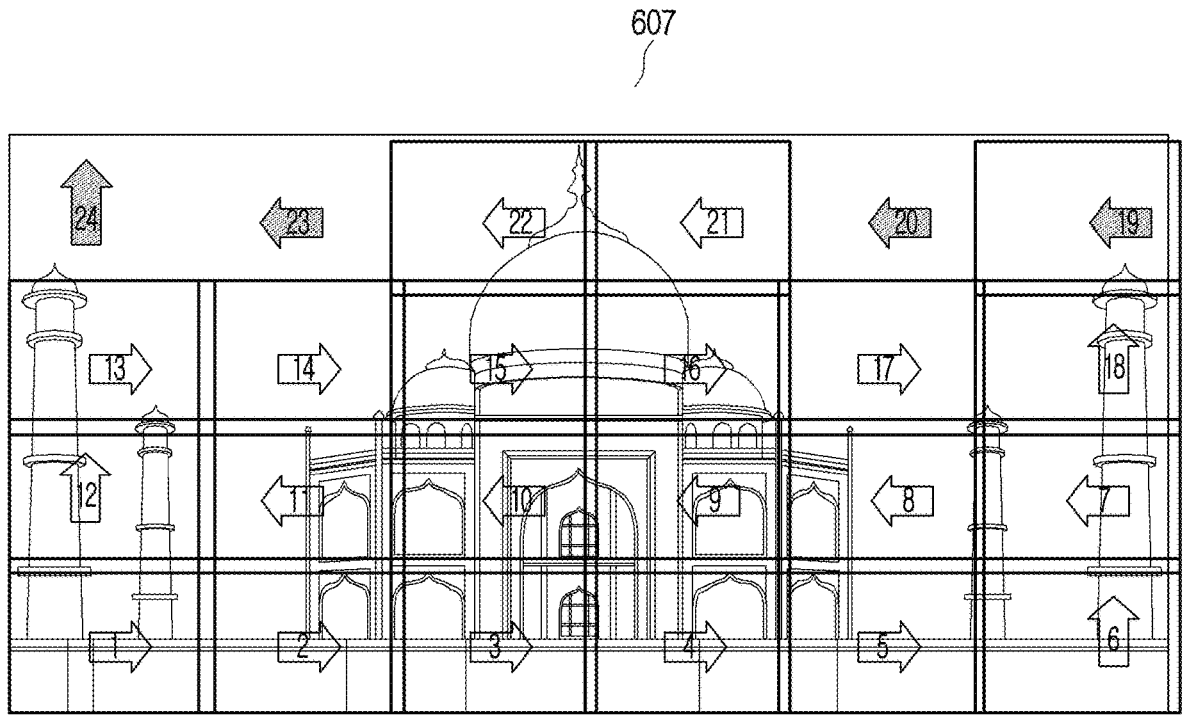
Figure 6D:
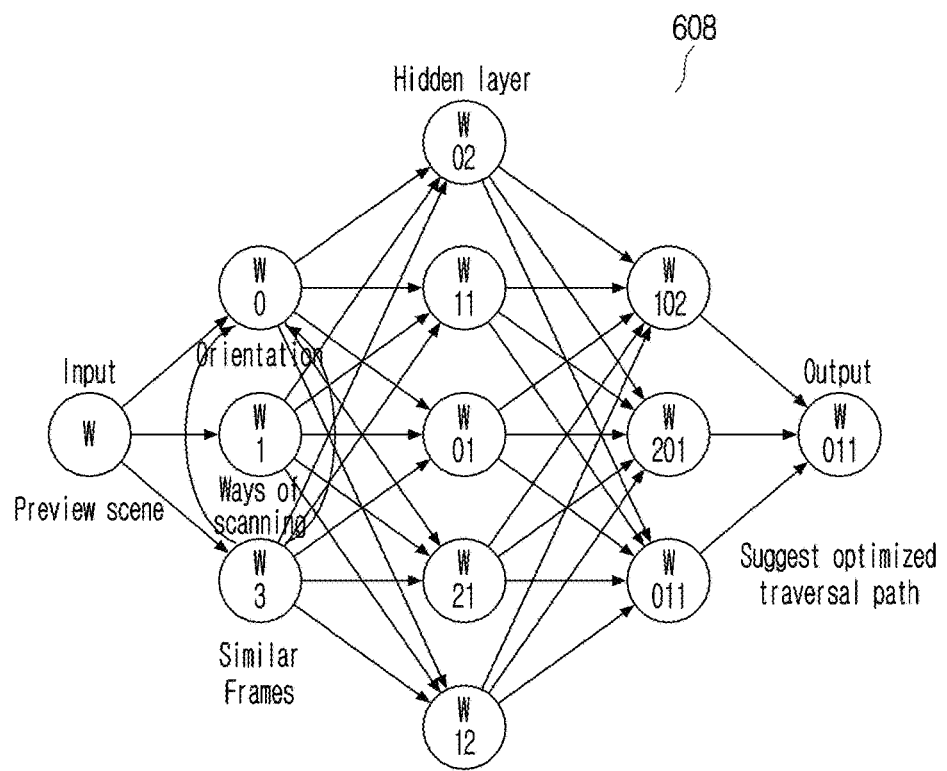

FIG. 5 is an example scenario illustrating various operations for obtaining the scene preview with the optimal wider view using the camera sensor(s) (150) of the electronic device (100), according to an embodiment of the disclosure.

At 501, the scene viewer (171) detects that the user of the electronic device (100) opens the camera application in the panorama mode. At 502, the scene viewer (171) then obtains the first scene preview (502a) by using the zoomed-out feature (e.g. 1.0x) of the camera sensor (150). The scene viewer (171) then obtains the second scene preview (502b) by using the increased zoomed-out feature (e.g. 0.5x) of the camera sensor (150). The scene viewer (171) then determines whether feature information changes between the first scene preview (502a) and the second scene preview (502b), where changes in the feature information are detected by the ML model (180). Examples of the feature information such as an onion dome (502aa), a lotus decoration (502ab), an arch (502ac), a chattri (502ad), and corner minarets (502ba).

In an embodiment, the scene viewer (171) then replaces the second scene preview (502b) with the first scene preview (502a) and obtains the second scene preview (502c) by using the increased zoomed out feature (e.g. 0.25x) of the camera sensor (150) in response to determining that the feature information changes between the first scene preview (502a) and the second scene preview (502b). The above-mentioned process is repeated till the feature information does not change between two consecutive scene previews. At 503, as a result, the scene viewer (171) selects the second scene preview (502c) as the obtained scene preview with the optimal wider view and passes the obtained scene preview to the AI scene analyzer (172) for further process to generate the panoramic image.

FIGS. 6A, 6B, 6C, and 6D are an example scenario illustrating various operations for analyzing the obtained scene preview to recommend the optimal traversal path to generate the panoramic image, according to various embodiments of the disclosure.

Upon receiving the obtained scene preview from the scene viewer (171), the AI scene analyzer (172) determines the orientation of the electronic device (100) using the sensor (160) of the electronic device (100) and determines the scanning direction on the obtained scene preview with the detected orientation using the ML model (180) to capture the plurality of frames, where the scanning direction includes a plurality of traversal paths. Table 1 shows an example of the traversal path(s).

TABLE 1

| Traversal path (scanning way (orientation)) |
| --- |
| Single row (portrait/landscape) (601) |
| Single column (portrait/landscape) (602) |
| Multi row-wise/portrait (603) |
| Multi row-wise/landscape (604) |
| Multi column-wise/portrait (605) |
| Multi column-wise/landscape (606) |

In an embodiment, the AI scene analyzer (172) then determines the total number of frames and change in direction of movement for each traversal path, generates the mapping of similar frames for each traversal path, and removes the similar frames based on the mapping.

For example, at 601, when traversing in the single row (e.g. moving from 1 to 6, notation as shown in the FIG.) whether the electronic device (100) in the landscape mode or the portrait mode complete view cannot be captured. In another example, at 602, when traversing in the single-column (e.g. moving from 1 to 3, notation as shown in the FIG.) whether the electronic device (100) in the landscape mode or the portrait mode complete view cannot be captured.

For example, at 603, when the electronic device (100) is operating in the portrait mode and traversing in row-wise manner to capture frames of the scene. The AI scene analyzer (172) detects the similar frames (i.e. 14, 25, 26, 27, 28, 29, 31, 32, 33, 34, 35, and 36). As a result, the number of frames necessary to capture the scene is 25 out of 36. Furthermore, the AI scene analyzer (172) detects the change in direction of movement is 2 (i.e. moving from 12 to 13 and moving from 24 to 25).

In another example, at 604, when the electronic device (100) is operating in the landscape mode and traversing in the row-wise manner to capture frames of the scene. The AI scene analyzer (172) detects similar frames (i.e. 19, 20, 23, and 24). As a result, the number of frames necessary to capture the scene is 21 out of 24. Furthermore, the AI scene analyzer (172) detects the change in direction of movement is 3 (i.e. moving 6 to 7, moving 12 to 13, and moving 18 to 19).

For example, at 605, when the electronic device (100) is operating in the portrait mode and traversing in the column-wise manner to capture frames of the scene. The AI scene analyzer (172) detects the similar frames (i.e. 3, 4, 9, 10, 15, 21, 22, 27, 28, 32, 33, and 34). As a result, the number of frames necessary to capture the scene is 25 out of 36. Furthermore, the AI scene analyzer (172) detects the change in direction of movement is 11 (i.e. moving 3 to 4, moving 6 to 7, moving 9 to 10, moving 12 to 13, moving 15 to 16, moving 18 to 19, moving 21 to 22, moving 24 to 25, moving 27 to 28, moving 30 to 31, and moving 33 to 34).

In another example, at 606, when the electronic device (100) is operating in the landscape mode and traversing in column-wise manner to capture frames of the scene. The AI scene analyzer (172) detects similar frames (i.e. 4, 5, 20, and 21). As a result, the number of frames necessary to capture the scene is 21 out of 24. Furthermore, the AI scene analyzer (172) detects the change in direction of movement is 5 (i.e. moving 4 to 5, moving 8 to 9, moving 12 to 13, moving 16 to 17, and moving 20 to 21).

The AI scene analyzer (172) then recommends the optimal traversal path to capture the plurality of frames to generate the panoramic image based on the correlation (traversal cost equation (608), equation-1), as shown in Table 2, where the optimal traversal path (607) includes the least number of frames and the least change in direction of movement among the plurality of traversal paths. The traversal cost is calculated for each traversal path is given in Equation 1, $$C_T = \sum_{i=1}^{n} TF + \sum_{i=1}^{m} \Delta D - \sum_{i=1}^{k} SF$$

Equation 1 where $C_r$ is traversal cost, TF is total frames, $\Delta D$ is the change in direction and SF is similar frames.

TABLE 2

| Traversal Analysis | Total Frames | Change in Direction | Similar Frame | Traversal Cost | Remarks |
| --- | --- | --- | --- | --- | --- |
| Single Row (portrait/landscape) | N.A. | N.A. | N.A. | N.A. | A complete view cannot be captured. |
| Single Column (portrait/landscape) | N.A. | N.A. | N.A. | N.A. | A complete view cannot be captured. |
| Multi Row-wise & portrait | 36 | 2 | 11 | 27 | Frames require to capture view is more. |
| Multi Row-wise & landscape | 24 | 3 | 3 | 24 | Most optimized traversal to capture view. |

TABLE 2-continued

| Traversal Analysis | Total Frames | Change in Direction | Similar Frame | Traversal Cost | Remarks |
|---|---|---|---|---|---|
| Multi Column-wise & portrait | 36 | 11 | 11 | 36 | Frames require to capture view is more. |
| Multi Column-wise & landscape | 24 | 5 | 3 | 26 | Change in direction to capture view is more leading to distortion/blurriness. |

Figure 7:
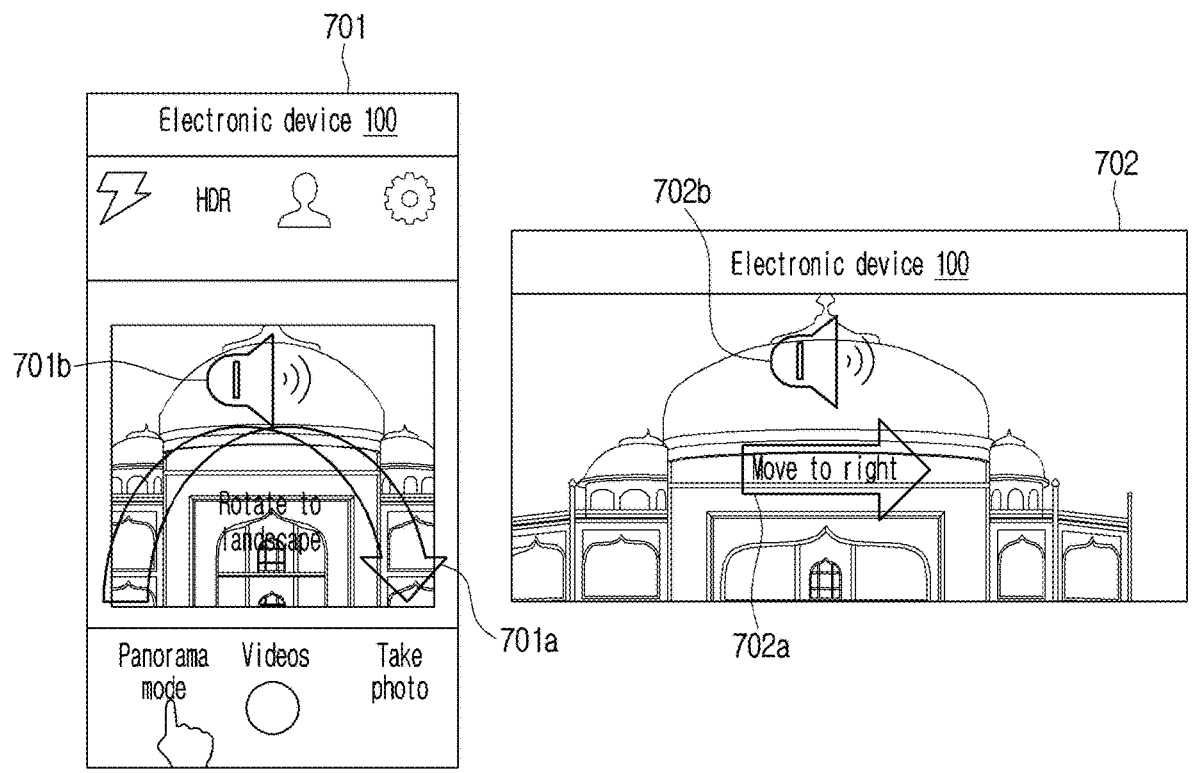
FIG. 7 is an example scenario illustrating various ways to recommend the optimal traversal path to generate the panoramic image, according to an embodiment of the disclosure.

FIG. 7 is an example scenario illustrating various ways to recommend the optimal traversal path to generate the panoramic image, according to an embodiment of the disclosure.

At 701 and 702, the optimal traversal path recommender (173) recommends the optimal traversal path to capture the plurality of frames to generate the panoramic image based on the correlation, where the optimal traversal path includes the least number of frames and the least change in direction of movement among the plurality of traversal paths Table 2. Furthermore, the optimal traversal path recommender (173) displays the text recommendation (e.g. rotate to landscape, move to right) on the screen (140) of the electronic device (100) and/or display the image recommendation (701a, 702a) on the screen (140) of the electronic device (100) and/or play the audio clip for recommendation (701b, 702b) in the electronic device (100).

Figure 8:
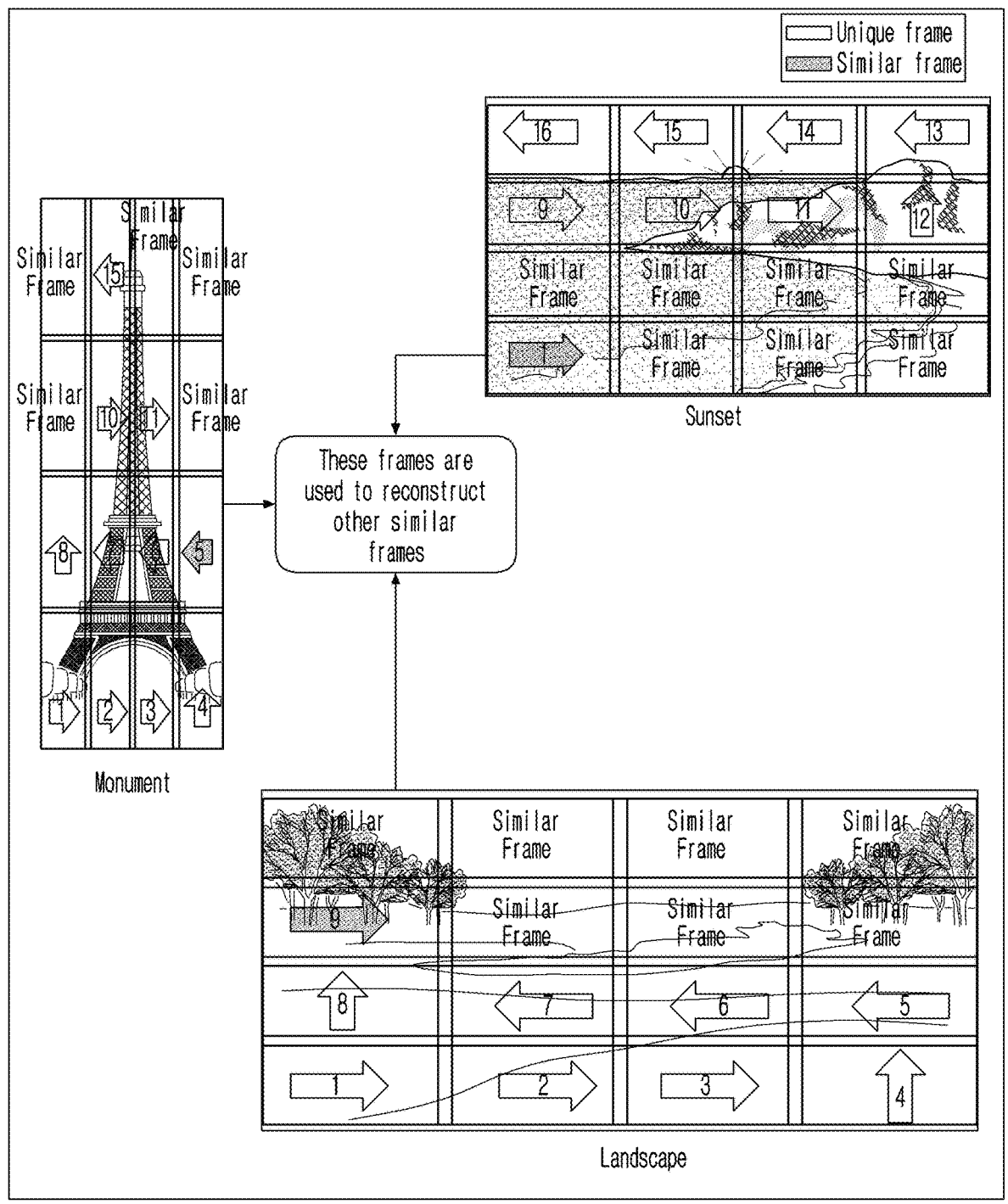
FIG. 8 illustrates various example scenarios with the recommended optimal traversal path to generate the panoramic image, according to an embodiment of the disclosure.

FIG. 8 illustrates various example scenarios with the recommended optimal traversal path to generate the panoramic image, according to an embodiment of the disclosure.

The technical description is the same as described in FIGS. 4A, 4B, 4C, 5, 6A, 6B, 6C, 6D, and 7.

In an embodiment, the electronic device (100) provides a high-resolution image with more Dots Per Inch (DPI) that may be obtained of the same view, reduces memory usage by approximately 25% as less number of frames are required to be captured for generating panorama, reduces blurriness and misalignment of frames by limiting direction change while capturing frames, reduces distortion as less number of frames are required to be stitched for generating panorama, minimizes the processing time by approximately 30% for generating panorama, as less number of frames to be captured and stitched, and reduces the power consumption by approximately 30% by limiting camera usage as less number of frames are required to be captured by the camera (150).

The embodiments disclosed herein may be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an electronic device for generating a panoramic image, the method comprising:
obtaining, by the electronic device, a first scene preview by using a zoomed out feature of at least one camera sensor of the electronic device;
obtaining, by the electronic device, at least one second scene preview with a wider view than the first scene preview using the at least one camera sensor;
determining, by the electronic device, whether feature information changes between the first scene preview and the at least one second scene preview;
based on a result of determining whether the feature information changes, performing, by the electronic device, one of:
selecting the first scene preview as the at least one second scene preview with the wider view based on determining that the feature information does not change between the first scene preview and the at least one second scene preview, or
replacing the at least one second scene preview with the first scene preview and obtaining the at least one second scene preview by using at least one increased zoomed out feature of the at least one camera sensor based on determining that the feature information changes between the first scene preview and the at least one second scene preview;
obtaining, by the electronic device based on the at least one second scene preview, a traversal path having a least number of frames and a least change in direction of movement among a plurality of traversal paths;
capturing, by the electronic device, a plurality of frames using the traversal path to generate the panoramic image; and
storing, by the electronic device, the panoramic image.

2. The method of claim 1, wherein the obtaining, by the electronic device, of the at least one second scene preview comprises:
detecting, by the electronic device, that a user of the electronic device opens a camera application in a panorama mode;
obtaining, by the electronic device, the at least one second scene preview by using the at least one increased zoomed out feature of the at least one camera sensor; and
determining, by the electronic device, whether at least one machine learning (ML) model detected that the feature information changes between the first scene preview and the at least one second scene preview.

3. The method of claim 1, wherein the obtaining, by the electronic device based on the at least one second scene preview, of the traversal path comprises:
determining, by the electronic device, an orientation of the electronic device using at least one sensor of the electronic device, wherein the orientation comprises one of a landscape mode or a portrait mode;

determining, by the electronic device, a scanning direction on the at least one second scene preview with the orientation using at least one machine learning (ML) model to capture the plurality of frames to generate the panoramic image, wherein the scanning direction comprises the plurality of traversal paths;

determining, by the electronic device, a total number of frames and change in direction of movement for each traversal path;

determining, by the electronic device, at least one frame of the plurality of frames in the at least one second scene preview that is similar to at least one second frame of the plurality of frames by detecting at least one feature of at least one object displayed in the at least one frame being similar to at least one feature of at least one object displayed in the at least one second frame for each traversal path, wherein the at least one feature is detected by the at least one ML model;

generating, by the electronic device, a mapping of similar frames for each traversal path;

removing, by the electronic device, the similar frames based on the mapping;

re-determining, by the electronic device, the total number of frames and the change in direction of movement for each traversal path to recommend the traversal path;

correlating, by the electronic device, the orientation, the scanning direction, and the similar frames; and recommending, by the electronic device, the traversal path to capture the plurality of frames to generate the panoramic image based on the correlation.

4. The method of claim 1, wherein the plurality of traversal paths comprises at least one of a single row path, a single column path, a multi-row path, and a multi-column path.

5. The method of claim 3, wherein the traversal path is recommended to a user of the electronic device by at least one of:

displaying, by the electronic device, a text recommendation on a screen of the electronic device;

displaying, by the electronic device, an image recommendation on the screen of the electronic device; and playing, by the electronic device, an audio clip for recommendation in the electronic device.

6. The method of claim 1, wherein the plurality of frames is stitched together to generate the panoramic image using at least one machine learning (ML) model.

7. The method of claim 1, further comprising:

generating, by the electronic device, the panoramic image, wherein the panoramic image is generated by:

receiving, by the electronic device, a stitched image for each traversal path from a stitching engine;

receiving, by the electronic device, a mapping of similar frames for each traversal path from a feature analyzer; and regenerating, by the electronic device, the panoramic image using the received mapping of similar frames for each traversal path, the stitched image, and the at least one second scene preview from memory of the electronic device.

8. An electronic device for generating a panoramic image, the electronic device comprising:

memory;

at least one processor;

at least one camera sensor; and panorama processing circuitry operably connected to the memory, the at least one camera sensor, and the at least one processor, wherein the panorama processing circuitry is configured to:

obtain a first scene preview by using a zoomed out feature of the at least one camera sensor, obtain at least one second scene preview with a wider view than the first scene preview using the at least one camera sensor, determine whether feature information changes between the first scene preview and the at least one second scene preview, based on a result of determining whether the feature information changes, control to perform one of:

selecting the first scene preview as the at least one second scene preview with the wider view based on determining that the feature information does not change between the first scene preview and the at least one second scene preview; or replacing the at least one second scene preview with the first scene preview and obtaining the at least one second scene preview by using at least one increased zoomed out feature of the at least one camera sensor based on determining that the feature information changes between the first scene preview and the at least one second scene preview, obtain, based on the at least one second scene preview, a traversal path having a least number of frames and a least change in direction of movement among a plurality of traversal paths, capture a plurality of frames using the traversal path to generate the panoramic image, and store the panoramic image in the memory.

9. The electronic device of claim 8, wherein, to obtain the at least one second scene preview, the panorama processing circuitry is further configured to:

detect that a user of the electronic device opens a camera application in a panorama mode, obtain the at least one second scene preview by using the at least one increased zoomed out feature of the at least one camera sensor, and determine whether at least one machine learning (ML) model detected that the feature information changes between the first scene preview and the at least one second scene preview.

10. The electronic device of claim 8, wherein, to obtain, based on the at least one second scene preview, the traversal path, the panorama processing circuitry is further configured to:

determine an orientation of the electronic device using at least one sensor of the electronic device, wherein the orientation comprises one of a landscape mode or a portrait mode, determine a scanning direction on the at least one second scene preview with the orientation using at least one machine learning (ML) model to capture the plurality of frames to generate the panoramic image, wherein the scanning direction comprises the plurality of traversal paths, determine a total number of frames and change in direction of movement for each traversal path, determine at least one frame of the plurality of frames in the at least one second scene preview that is similar to at least one second frame of the plurality of frames by detecting at least one feature of at least one object displayed in the at least one frame being similar to at least one feature of at least one object displayed in the at least one second frame for each traversal path, wherein the at least one feature is detected by the at least one ML model, generate a mapping of similar frames for each traversal path, remove the similar frames based on the mapping, re-determine the total number of frames and the change in direction of movement for each traversal path to recommend the traversal path, correlate the orientation, the scanning direction, and the similar frames, and recommend the traversal path to capture the plurality of frames to generate the panoramic image based on the correlation.

11. The electronic device of claim 8, wherein the plurality of traversal paths comprises at least one of a single row path, a single column path, a multi-row path, and a multi-column path.

12. The electronic device of claim 10, wherein the traversal path is recommended to a user of the electronic device by at least one of:

displaying a text recommendation on a screen of the electronic device;

displaying an image recommendation on the screen of the electronic device; and playing an audio clip for recommendation in the electronic device.

13. The electronic device of claim 8, wherein the plurality of frames is stitched together to generate the panoramic image using at least one machine learning (ML) model.

14. The electronic device of claim 8, wherein, to generate the panoramic image, the panorama processing circuitry is further configured to:

receive a stitched image for each traversal path from a stitching engine;

receive a mapping of similar frames for each traversal path from a feature analyzer; and regenerate the panoramic image using the mapping of similar frames for each traversal path, the stitched image and the at least one second scene preview from memory of the electronic device.

15. The electronic device of claim 8, wherein a number of frames to capture the at least one second scene preview is 25 frames out of 36 frames when the electronic device is operating in a portrait mode and traversing in a row-wise manner.

16. The electronic device of claim 8, wherein a number of frames to capture the at least one second scene preview is 21 frames out of 24 frames when the electronic device is operating in a landscape mode and traversing in a row-wise manner.

17. The electronic device of claim 8, wherein the panoramic image is generated based on a correlation of the least number of frames and the least change in direction of movement among the plurality of traversal paths.

* * * * *